April 12, 1927.

E. H. PACKER

PISTON RING

Filed Feb. 8, 1926

1,624,279

INVENTOR
E. H. PACKER

BY
ATTY.

Patented Apr. 12, 1927.

1,624,279

UNITED STATES PATENT OFFICE.

ELDREDGE H. PACKER, OF SAN FRANCISCO, CALIFORNIA.

PISTON RING.

Application filed February 8, 1926. Serial No. 86,768.

This invention relates to improvements in piston rings and the main purpose of the invention being to provide for maintaining the piston rings in proper engagement with the cylinder at all times regardless of wear upon the rings whereby lubricating oil is prevented from working upward past the rings and fouling the spark plugs and creating other objectionable conditions, and the desired compression is at all times provided.

An object of the invention is to provide a simple and inexpensive piston ring arrangement of the character described which may be readily incorporated with the ordinary types of pistons without necessitating appreciable changing of the construction of the pistons.

More specifically my invention comprises a means which may be readily and easily applied to the ordinary piston and which will operate at all times to cause the ordinary piston ring to be held in proper engagement with the cylinder. Accordingly I provide an expanding means of simple and inexpensive form which may be readily and easily placed inside of a piston and caused to extend through the piston wall into the piston ring groove so as to engage the piston ring and force it outward into yielding engagement with the cylinder. This expanding means is constructed so that it will apply an expanding force evenly throughout the ring and the ring will therefore wear evenly. To provide an ordinary piston for the attachment thereto of the expanding means of my invention, it is only necessary to drill or otherwise form small openings at spaced points through the backs of the piston ring grooves.

With the above mentioned and other objects in view, the invention consists in the novel construction and combination of parts hereinafter described, illustrated in the accompanying drawing, and set forth in the claims hereto appended, it being understood that various changes in the form, proportion, size and minor details of construction within the scope of the claims may be resorted to without departing from the spirit or sacrificing any of the advantages of the invention.

Referring to the drawing.

Figure 1:
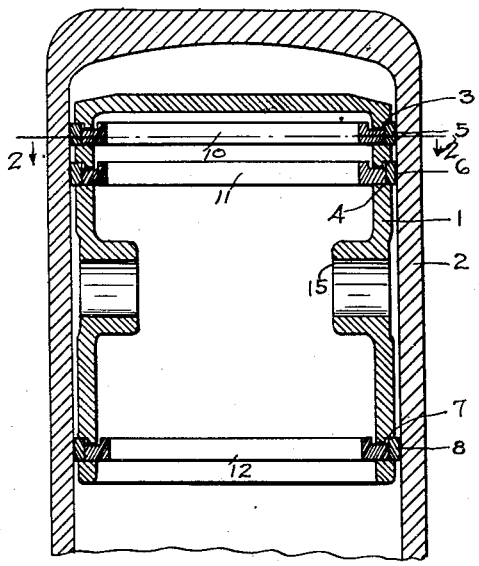
Fig. 1 represents a vertical sectional view of a piston and cylinder showing the ring and expanding means of my invention.

The embodiment of the invention illustrated in the accompanying drawing is applied to a hollow piston 1 of the ordinary type adapted to be operated in the customary manner in a cylinder 2. Adjacent the upper end of this piston in the cylindrical wall thereof are the usual piston ring grooves 3 and 4, in which are contained ordinary piston rings 5 and 6, which rings engage the inner wall of the cylinder.

Adjacent the lower end of the piston is a similar piston ring groove 7 adapted to contain a ring 8. Elongated openings 9, preferably of rectangular form, are formed through the back walls of the piston ring grooves 3, 4 and 7, the longitudinal axes of which openings are preferably disposed in horizontal planes. The formation of these openings in the walls of the piston is the only modification of the ordinary piston required to carry out my invention.

The expanding means of my invention comprises a plurality of spring devices which are adapted to be inserted into the hollow piston and to extend through the openings 9 so as to exert an equal and evenly distributed outward pressure on the piston rings. These devices may be in the form of split resilient rings designated 10, 11 and 12, which rings are of identical construction. Each ring has upon its perimeter a plurality of pin-like projections 13 which extend through the openings 9 and engage the rear faces of the piston rings. The length of these pins is such that when the piston is in proper position in the cylinder, the expanding rings will be spaced circumferentially from the inner surface of the piston as shown particularly in Fig. 2. The split rings are so formed that they are placed under tension when fitted into place and therefore they exert at all times the necessary yielding pressure against the piston rings to insure the proper engagement of said piston rings with the cylinder even after said piston rings have been worn considerably. Any suitable method of splitting the rings 10, 11 and 12 may be employed. In the present instance there is provided an ordinary lapped joint shown at 14. The resilient split rings for the upper piston rings are capable of being easily inserted into place interiorly of the piston, when the pistons are of the type shown in Figs. 1 and 2, having the wrist pin bearings 15 disposed considerably below the plane of the upper ring grooves in the piston.

Figure 3:
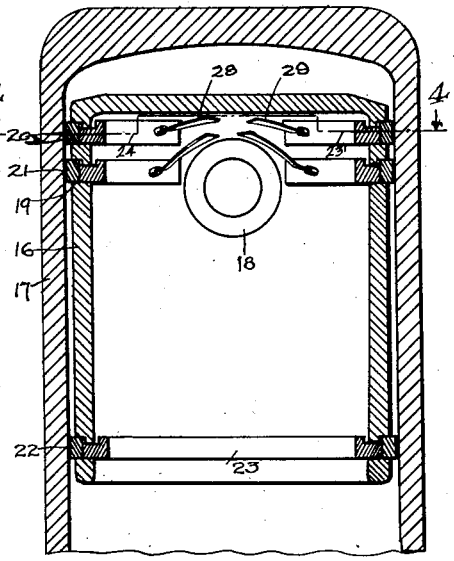
Fig. 3 represents a vertical sectional view of a modified form of the invention.
Figure 2:
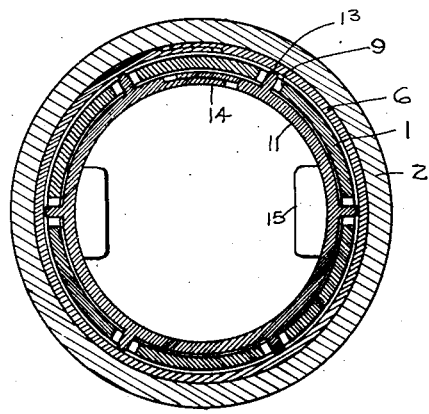
Fig. 2 represents a horizontal sectional view of the piston taken on the line 2—2 of Fig. 1.
Figure 4:
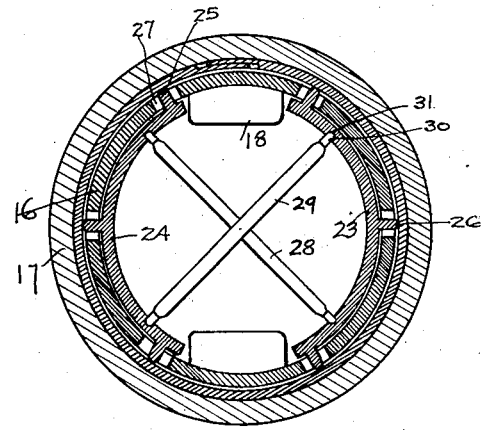
Fig. 4 represents a cross sectional view taken on the plane of line 4—4 of Fig. 3.

In Figs. 3 and 4 there is shown a piston 16 in a cylinder 17 in which the wrist pin bearings 18 are disposed in the upper part of the piston substantially in line with the piston ring grooves 19. With pistons of this type I provide a modified form of expanding means to be fitted interiorly of the piston for the upper piston rings 20 and 21, but for the lower ring 22 I use a split ring 23 of the same form as shown in Figs. 1 and 2. The means for holding the upper piston rings in proper engagement with the cylinder at all times with this type of piston comprises ring segments 23' and 24, each of which segments is provided with outward projections 25 identical with the projections 13 of the other form of the invention. These projections are adapted to extend through openings 27 in the piston, which openings correspond to the openings 9, the projections 25 engaging the piston rings 21 and 20 in the same manner as in the other form of the invention. The ring segments are of such length that when fitted into place they will clear the wrist pin bearings 18. A spring means is interposed between the ring segments so as to force them outwardly and to cause the projections 25 to press outward on the piston rings. This spring means in the present instance, comprises two leaf springs designated 28 and 29. These springs are identical as to construction and each is provided at its ends with suitable tips 30, which tips are adapted to slidably but snugly engage in small openings 31 provided in the inner sides of the ring segments adjacent the ends of said segments. To place this expanding means in place, first one segment of each device is pushed upward into position to cause the projections to engage in the openings 27, and then the other segment is likewise moved into position. After this, the two springs are moved in place and the length of these springs is such that they must be placed under tension in order that the tips 30 may be engaged in the openings 31. These springs exert a force on the ring segments so that the projections 25 on the segments will push outward on and yieldingly maintain the piston rings in proper engagement with the cylinder. The arrangement of this form of the invention is such that the force is evenly applied to the piston rings and said piston rings will therefore wear evenly.

In both forms of the invention the projections which extend through the openings and engage the piston rings are flat on upper and lower sides and have a snug fit with the corresponding side of the openings through which they extend but their horizontal diameters are considerably less than the diameters of the openings so that they will be permitted to shift or move with the movement of the piston ring and due to this freedom of movement a proper and even distribution of the outward pressure is insured.

I claim:

1. The combination with a cylinder and a piston operating in the cylinder, which piston is provided with a piston ring groove and with openings extending through the back of the groove, of a piston ring mounted in said groove and means interiorly of the piston for holding said piston ring in yielding engagement with said cylinder, which means includes a split ring and projections on said split ring extending through said openings and engaging said piston ring.

2. The combination with a cylinder and a piston operating in the cylinder, which piston is provided with a piston ring groove and openings extending through the piston at the back of the groove, of a piston ring mounted in the groove, a resilient ring mounted within the piston and portions on said ring extending through said openings and engaging the back of the piston ring.

3. The combination with a cylinder, a piston operating in the cylinder, which piston is provided with a piston ring groove and with openings extending through the wall of the piston at the back of the groove, of a piston ring mounted in the groove, and a resilient split ring mounted within the piston and projections on said split ring extending through said openings and engaging said piston ring.

ELDREDGE H. PACKER.